(12) United States Patent
Blinzer

(10) Patent No.: US 8,595,386 B2
(45) Date of Patent: Nov. 26, 2013

(54) SOFTWARE CONTROLLED REDIRECTION OF CONFIGURATION ADDRESS SPACES

(75) Inventor: Paul Blinzer, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 485 days.

(21) Appl. No.: 12/534,351

(22) Filed: Aug. 3, 2009

(65) Prior Publication Data

US 2011/0029694 A1 Feb. 3, 2011

(51) Int. Cl.
*G06F 3/00* (2006.01)

(52) U.S. Cl.
USPC .............................................................. 710/9

(58) Field of Classification Search
USPC .............................................................. 710/9
See application file for complete search history.

(56) References Cited

U.S. PATENT DOCUMENTS

| 5,546,590 A * | 8/1996 | Pierce | 713/323 |
| 6,721,868 B1 * | 4/2004 | Natu et al. | 711/202 |
| 6,954,879 B1 * | 10/2005 | Tobias et al. | 714/30 |

\* cited by examiner

*Primary Examiner* — Henry Tsai
*Assistant Examiner* — Juanito Borromeo
(74) *Attorney, Agent, or Firm* — Volpe and Koenig, P.C.

(57) ABSTRACT

A peripheral device can be powered off when not in use by redirecting accesses to the peripheral device's configuration space from the peripheral device to a memory located separate from the peripheral device. A method for redirecting accesses includes copying the current contents of the configuration space to the memory. Accesses to the configuration space are redirected to the memory, whereby the memory services the accesses to the configuration space. After the redirection is enabled, the peripheral device can be powered off. When the peripheral device needs to be used again, it is powered on and the contents of the memory are copied to the configuration space. The configuration space can then resume servicing configuration space accesses.

14 Claims, 6 Drawing Sheets

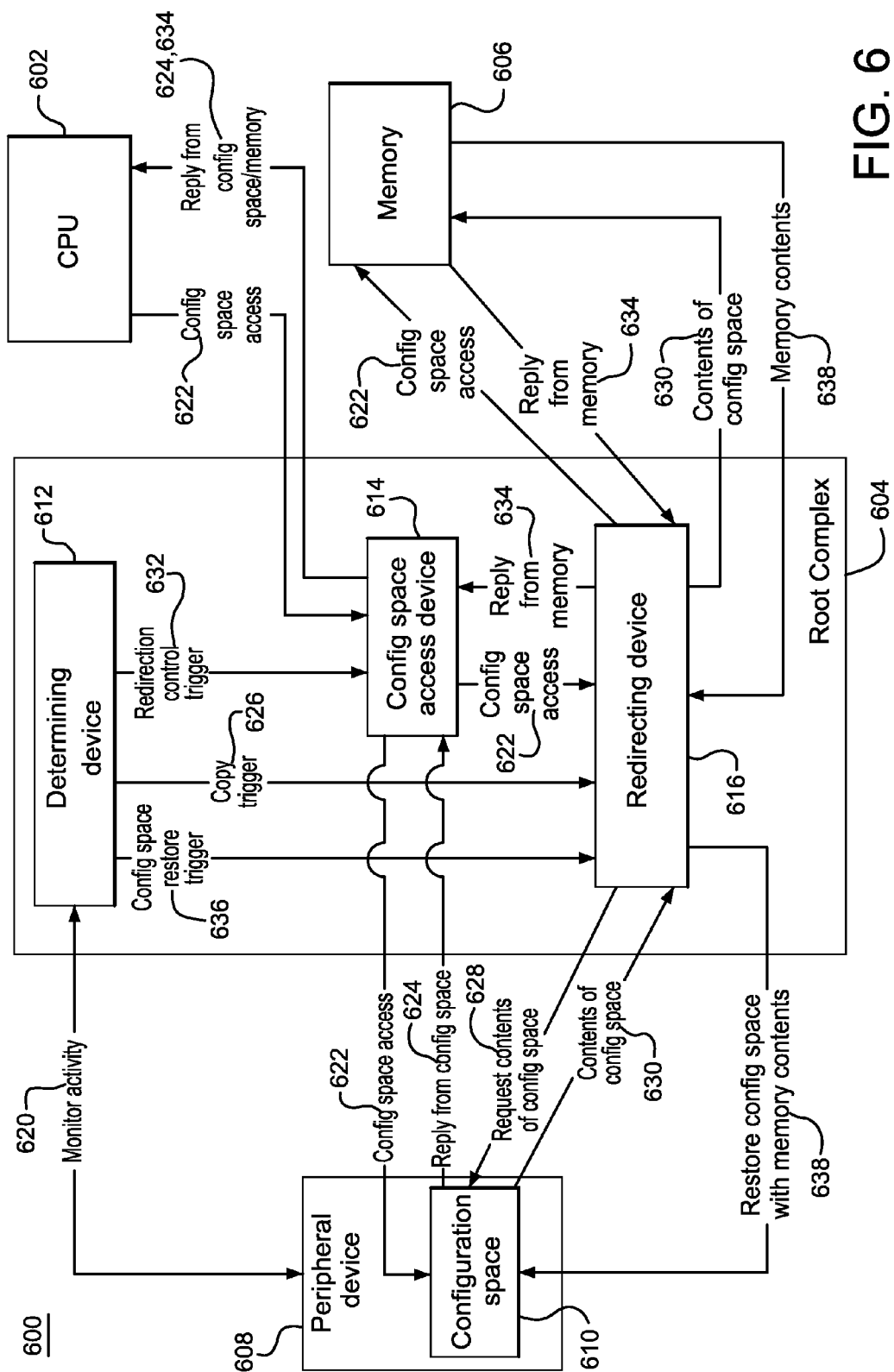

SOFTWARE CONTROLLED REDIRECTION OF CONFIGURATION ADDRESS SPACES

FIELD OF INVENTION

The present invention relates to a method and apparatus for redirecting accesses to a configuration space of a bus-connected device to a memory separate from the device.

BACKGROUND

Current mainstream operating systems (OSes), such as Microsoft WINDOWS XP, WINDOWS Vista, and WINDOWS 7, require idle devices to stay in a powered on state (but otherwise in a low-power state) to allow access to the Peripheral Component Interconnect (PCI) configuration space (a memory area that contains configuration information) of a connected device while the OS is running. Due to power leakage and other power impacts, the power draw of an idle device and the bus interface connecting the device to the rest of the system may be hundreds of milliwatts (mW) to several watts (W), depending on the hardware.

The Microsoft OSes do not allow driver-controlled arbitration of these accesses, like other OSes in the market (e.g., Apple's Mac OS or Linux 2.6.xx with appropriate configuration). Therefore, fully powering off the device requires lengthy and complex software mechanisms that take multiple seconds to perform.

While some OSes support a per-device $D3_{cold}$ state (where primary power is fully removed from the device) for PCI devices that are currently not in use, the Microsoft OSes do not. Due to this deficiency, current platform designs that want to realize additional power savings by avoiding bus interface and device power leakage are required to use OS-based plug and play (PnP) mechanisms to remove and attach the device. But those mechanisms introduce a long latency (around 3-7 seconds on WINDOWS Vista) until the device is fully powered on.

For non-PCI configuration space registers, control of the device registers is managed by the independent hardware vendor (IHV) drivers. Access to the PCI configuration space of the device can occur at arbitrary times by both the OS and low-level system software. Serious platform stability issues may occur if the device is powered off during the attempted access. The accesses mostly generate from the Microsoft PCI class driver without an OS-designed mechanism for access control by clients. One possible approach to remedy this involves replacing OS functionality with a filter driver, which has implications for system stability and WINDOWS Hardware Quality Labs (WHQL) device certification in some scenarios. There are some benefits in providing hardware assistance in the platforms' Root Complex for this purpose.

Existing ways of powering off a PCI device include using PnP operation, device voltage islands, and a PCI filter driver.

1. With PnP operation, the software uses OS mechanisms to virtually attach and detach the driver from operation (e.g., PnP Stop/PnP Start). After the device has been removed from OS operation, the device hardware can be powered off. This solution has disadvantages, including being intrusive to software, the OS and running applications may lose the device state and need to reinitialize, and not all applications may survive the device being powered down and may need to be restarted. This solution takes multiple seconds to complete, on average a minimum of 5-10 seconds on current OSes.

2. Device voltage islands involve isolating the device bus interface from the rest of the device to power off these sections independently. Configuration space accesses are still allowed while the rest of the ASIC is powered off. This solution has disadvantages because the bus interface is still powered, causing leakage and other power consumption adding up to an additional power draw of 0.4-3 W, depending on the actual hardware.

3. An OS-based PCI filter driver is a software filter driver that detects and redirects accesses to the configuration space through the PCI filter driver to a system memory location. This solution is fragile, because the filter driver that needs to be installed will not work in some OS operating modes and there are mechanisms (e.g., hardware virtual machine (VM), direct input/output (I/O) to CF8/CFC, and system management mode (SMM)) that are not detectable by this mechanism. Any such access may cause the system to hang.

SUMMARY

A method for redirecting accesses to a peripheral device's configuration space begins by copying the current contents of the configuration space to a memory separate from the peripheral device. Accesses to the configuration space are redirected to the memory, whereby the memory services the accesses to the configuration space. After the redirection is enabled, the peripheral device can be powered off. When the redirection has been deactivated, the peripheral device is powered on and the peripheral device's configuration space is set based on the current contents of the memory, whereby accesses to the configuration space are serviced by the configuration space.

A system for redirecting accesses to a peripheral device's configuration space includes a peripheral device having a configuration space, a memory located separate from the peripheral device, and a Root Complex. The Root Complex is in communication with the peripheral device and the memory. The Root Complex is configured to copy the current contents of the configuration space to the memory and redirect accesses from the configuration space to the memory, whereby the memory services the accesses to the configuration space. The system can then power off the peripheral device. When the peripheral device needs to be accessed, the system powers on the peripheral device. The Root Complex is further configured to deactivate the redirection once the peripheral device is powered on and set the peripheral device's configuration space based on the current contents of the memory, whereby accesses to the configuration space are serviced by the configuration space.

A root complex for redirecting accesses to a peripheral device's configuration space includes a configuration space access device and a redirecting device. The configuration space access device is configured to access the configuration space. The redirecting device is configured to copy the current contents of the configuration space to a memory located separate from the peripheral device and redirect accesses from the configuration space to the memory, whereby the memory services the accesses to the configuration space.

BRIEF DESCRIPTION OF THE DRAWINGS

A more detailed understanding of the invention may be had from the following description, given by way of example, and to be understood in conjunction with the accompanying drawings, wherein:

FIG. 6 is a diagram of a computer system configured to perform configuration space redirection for a peripheral device.

DETAILED DESCRIPTION

Figure 1:
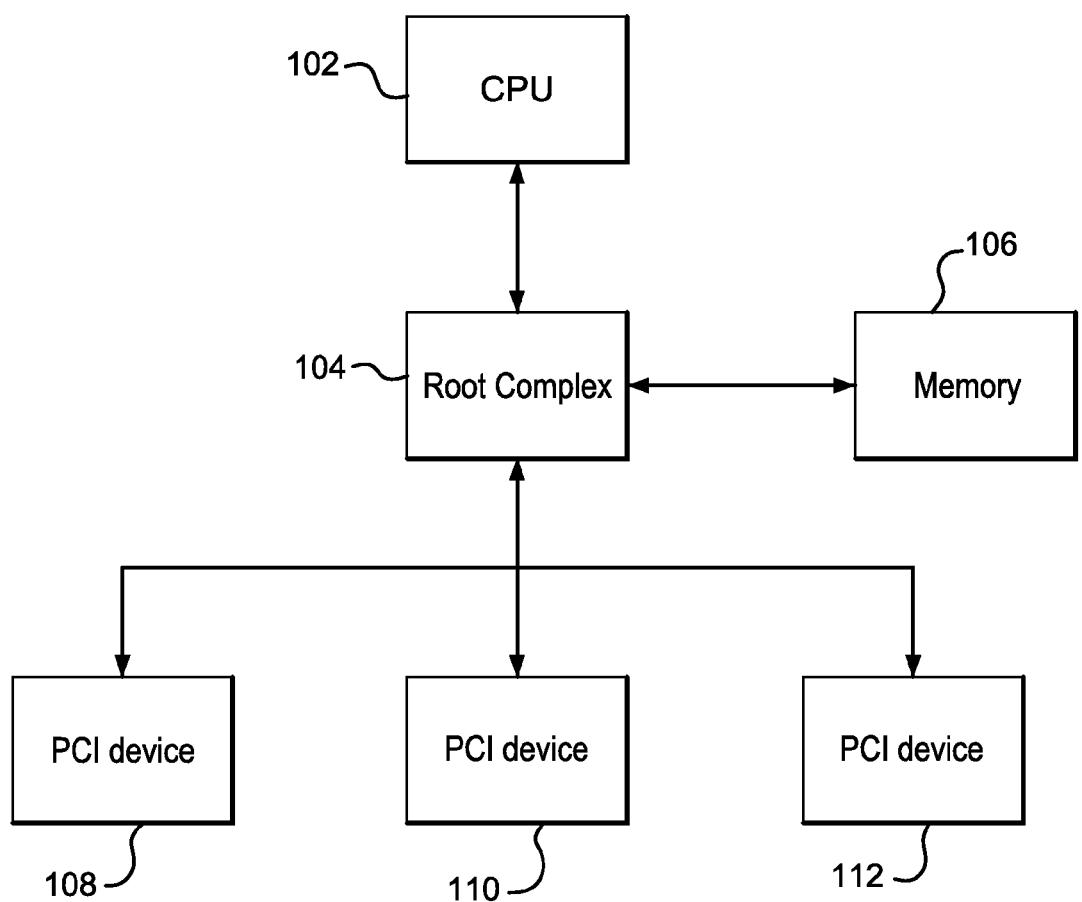
FIG. 1 is a block diagram of a computer system including PCI devices connected thereto.

A peripheral device can be powered off when not in use by redirecting accesses to the peripheral device's configuration space from the peripheral device to a memory located separate from the peripheral device. A method for redirecting accesses includes copying the current contents of the configuration space to the memory. Accesses to the configuration space are redirected to the memory, whereby the memory services the accesses to the configuration space. After the redirection is enabled, the peripheral device can be powered off. When the peripheral device needs to be used again, it is powered on and the contents of the memory are copied to the configuration space. The configuration space can then resume servicing configuration space accesses. In one embodiment, the peripheral device uses a PCI protocol. The principles of the present invention equally apply to other device bus protocols.

The redirection function disclosed herein may be included in the Root Complex or the PCI-Express (PCI-E) bridge. It allows a personal computer (PC) platform to place selected devices and bus nodes into a $D3_{cold}$ state without the need to support this feature through dedicated OS mechanisms and provides a high compatibility with legacy OSes. The devices benefiting from this feature do not need any special hardware support, as long as they support general PCI-Express 1.x or 2.x and PCI-PM 1.2 standard features. It is noted that PCI and PCI-Express are separate but logical protocol-compatible standards, and while the redirection function may be implemented over a PCI-Express bus, the term "PCI" as used herein covers implementations over a PCI bus or a PCI-Express bus.

The redirection function involves a minor PC platform hardware change, allowing IHV software to manage device transitions into and out of the $D3_{cold}$ state without involving OS PnP functionality and accompanied latencies. At the same time, this solution provides the full benefit of the $D3_{cold}$ state by turning off the full discrete device path, including the device bus links, with relatively low latency. The design supports multi-graphics processing unit (GPU) discrete graphics, but other externally connected device classes can benefit, allowing such devices to be powered off when not in use. The redirection function may also be useful in mobile platform scenarios. Similar power benefits for server and desktop platforms can be realized where some devices are only used occasionally, yet may have to be kept "ready" for OS or user/administrator-initiated operations.

Based on current generation experience, the added benefit of the redirection function is a power savings between 0.6-3 W compared to the $D3_{hot}$ state support (where primary power is not fully removed from the device) in the discrete device. The actual power savings depends on the discrete device configuration. For example, the $D3_{hot}$ state requires keeping the PCI configuration space and bus interface circuitry powered on, while switching off the rest of the discrete device's circuitry. Most of the power savings are realized by avoiding power leakage in the discrete device and the bus link circuitry.

With the design described, the chipset or Root Complex redirects PCI configuration space accesses to a specific storage location (either in system RAM or internal RAM) that mirrors the last hardware state of the device. The storage location is used to satisfy the OS PCI configuration space accesses as they occur, while the device driver or other support software can fully power off the device and the associated bus links by switching off their power rails to save power.

FIG. 1 is a block diagram of a computer system 100. The computer system 100 includes a central processing unit (CPU) 102, a Root Complex (RC) 104 in communication with the CPU 102, a memory 106 in communication with the RC 104, and PCI devices 108, 110, 112 in communication with the RC 104. The functionality of the RC is shown as reference number 104; it is understood by one of skill in the art that the functionality of the RC may be located in the CPU and in one or more application specific integrated circuits (ASICS) and may contain a number of PCI-E bridges. It is noted that any number of PCI devices may be connected to the RC 104; the number of PCI devices shown in FIG. 1 is merely exemplary. It is further noted that the computer system 100 may include components in addition to those shown in FIG. 1; the components shown in FIG. 1 are merely exemplary.

Figure 2:
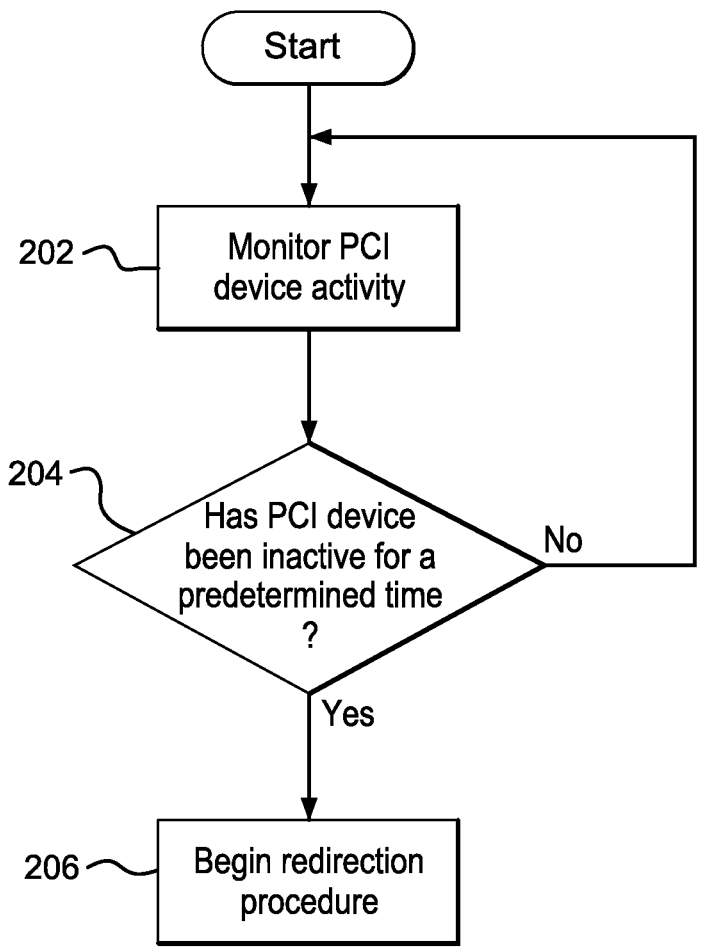
FIG. 2 is a flowchart of a method for determining when to begin a PCI configuration space redirection procedure.

FIG. 2 is a flowchart of a method 200 for determining when to begin a PCI configuration space redirection procedure. The method 200 begins by monitoring PCI device activity (step 202). A determination is made whether a PCI device has been inactive for a predetermined period of time (step 204). The length of the inactivity period of time is a design choice of the device manufacturer. If the PCI device has not been inactive for the predetermined period of time, then the PCI device is continuously monitored for inactivity. If the PCI device has been inactive for the predetermined period of time, then the redirection procedure is initiated (step 206).

Redirection and subsequent powering off of the PCI device will only take place when the software has determined that the device has not been used for a prolonged period of time and therefore powering off that device is possible. As one example, a graphics device has been idle for a period of time and the OS has put the screen into a power saving mode. The redirection function can then be enabled while the screen is in the power saving mode. As a second example, an add-in board (AIB) with multiple GPUs, that for regular desktop operation only uses one GPU, may power off additional GPUs when not needed for more demanding tasks and can scale performance as the application software requires. The actual access and control to the redirection function may be provided by Advanced Configuration and Power Interface (ACPI)-based firmware code that coordinates the redirection request with other PC platform requirements (e.g., input/output memory management unit (IOMMU) or device hotkeys).

Figure 3:
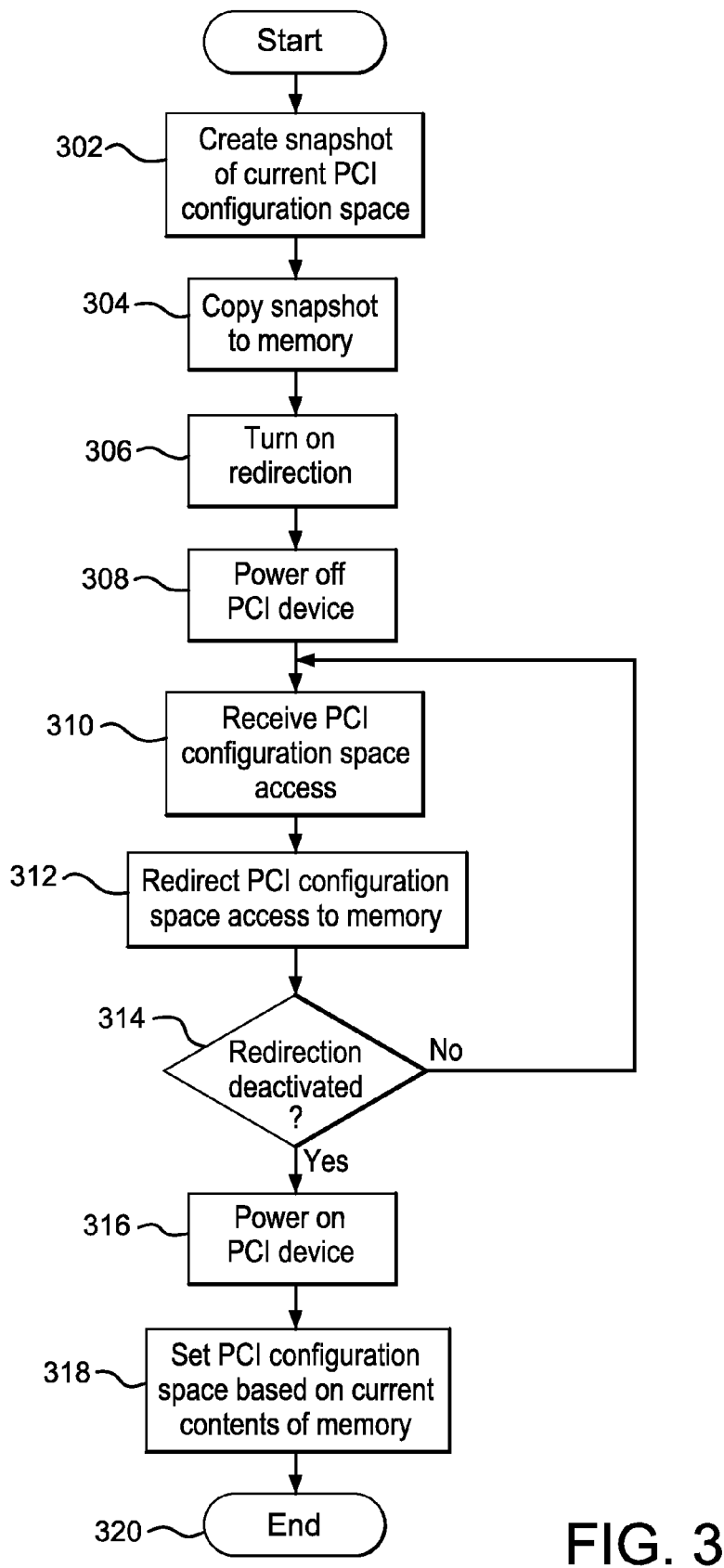
FIG. 3 is a flowchart of a method for performing a PCI configuration space redirection.

FIG. 3 is a flowchart of a method 300 for performing a PCI configuration space redirection for a given PCI device. A snapshot of the current PCI configuration space content for the PCI device is created (step 302) and is copied to a predetermined memory location assigned to the redirected device (step 304).

The redirection function is then activated (step 306). The controlling software (e.g., device driver) enables and disables the redirection function depending on the idle state of the device(s) associated with the operation. The hardware state is saved and later restored to a level to allow uninterrupted software operation after exiting the idle state. The PCI device is then powered off (step 308). The redirection function is also able to access the redirection storage to populate the memory location with pre-shutdown values and read any updated values from the OS while the device was shut down (i.e., the hardware device's power rails are powered down while the hardware is idle).

To support a per-device $D3_{cold}$ state, software (located in firmware and/or an IHV driver) instructs the Root Complex (RC) or Bridge to redirect PCI configuration space accesses targeted to a specific device (as identified by the routing protocol information) to the defined memory location instead. The memory location (e.g., RAM) may be either part of system memory (e.g., basic input/output system (BIOS) pre-OS allocation memory carve-out) or located on-die within the RC or bridge itself; this is a hardware design choice. As there are no performance requirements for those special-cycle accesses other than to finish within a specified time, the former option may be simpler to implement. Due to bus access rules (e.g., PCI-Express, HyperTransport (HT)), host access to the memory may be limited to specific periods when the redirection functionality is switched off to avoid deadlock scenarios. A deadlock scenario is a situation in which two or more processes are each waiting for the other to release a resource.

The redirection function receives a PCI configuration space access request for the PCI device (step 310). The redirection function redirects the PCI configuration space access request to the predetermined memory location (step 312). The RC detects PCI special configuration access cycles and the bus routing information contained in the address information to detect accesses to the configuration space and I/O and memory ranges of a device. If the address information matches the pre-set information as stored by the controlling software, this configuration space access is satisfied by either writing to or reading from the memory location. Accesses to other memory and I/O ranges of the device that are not issued by the hardware driver are erroneous by nature and cause the written data to either be discarded or deliver a fixed value (e.g., 0x00) for these accesses during the redirection. After the redirection functionality has been enabled, any further accesses to the configuration space by the OS PCI class driver or system software are now serviced by the memory until the redirection function is deactivated. The redirection function has to ensure that sections of the PCI configuration space that are required to be read-only by the PCI specifications follow this behavior.

A determination is made whether the redirection function has been deactivated (step 314). When the OS or the device driver requires the device to operate again, the driver restores the device hardware and the bus links to the pre-shutdown state, updates the device's PCI configuration space to the settings the OS last provided, and continues servicing the OS request. If the redirection function has not been deactivated (step 314), then the redirection function continues to handle any PCI configuration space access requests for the PCI device.

If the redirection function has been deactivated (step 314), then the PCI device is powered on (step 316). Waking up the powered-off device takes on the order of several hundred milliseconds. This length of time is acceptable, because other devices' startup times or other software startup times will mask the time required for the device to power on. The PCI configuration space is set based on the current contents of the memory (step 318). Before the redirection is deactivated, the software powers up the device, reinitializes the device to the pre-power-off state (this may be coordinated by the IHV device driver), and resets the device's PCI configuration space content according to any changes made by the OS for the writable memory locations. The method then terminates (step 320).

The method 300 can be applied to the example computer system 100 of FIG. 1 and to the PCI device 112 in accordance with one embodiment of the invention as follows. Once the RC 104 determines that the PCI device 112 has been inactive for a predetermined period of time, the RC 104 copies the contents of the configuration space of PCI device 112 to the memory 106. Any accesses to the configuration space of PCI device 112 are redirected by the RC 104 to the memory 106 and are serviced by the memory 106. The PCI device 112 can then be powered off. When the redirection is deactivated (for example, if the RC 104 needs to access the functionality of the PCI device 112), the PCI device 112 is powered on and the RC 104 copies the contents of the configuration space of PCI device 112 from the memory 106 to the PCI device 112. Further accesses to the configuration space of PCI device 112 are serviced by the configuration space.

Figure 4:
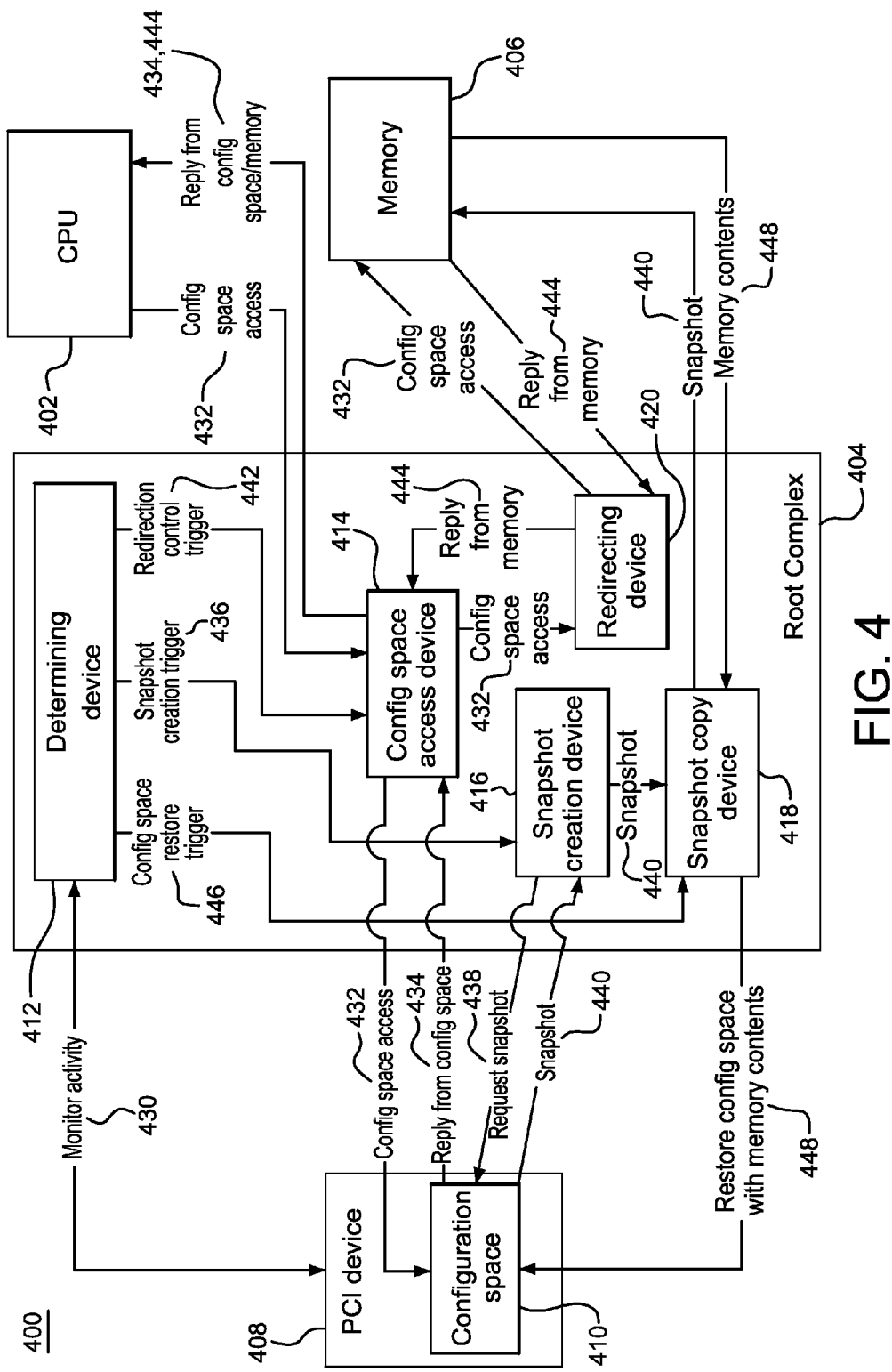
FIG. 4 is a diagram of a computer system configured to perform PCI configuration space redirection.

FIG. 4 is a diagram of a computer system 400 configured to perform PCI configuration space redirection in accordance with another embodiment of the invention. It is noted that the computer system 400 is exemplary and the one skilled in the art may design other computer systems to implement the redirection function.

The system 400 includes a CPU 402, a Root Complex (RC) 404, a memory 406, and a PCI device 408 having a configuration space 410. The RC 404 includes a determining device 412, a configuration space access device 414, a snapshot creation device 416, a snapshot copy device 418, and a redirecting device 420. In one embodiment, the configuration space access device 414 does not exist independently of the redirection device 420. While the determining device 412, the configuration space access device 414, the snapshot creation device 416, the snapshot copy device 418, and the redirecting device 420 are shown as separate devices, the functionality of these devices may be incorporated into a single device. Furthermore, the functionality of these devices may be embodied in discrete hardware devices, a single hardware device, discrete software modules, or a single software module.

In operation, the system 400 functions as follows. The determining device 412 monitors the activity 430 of the PCI device 408. The CPU 402 issues a configuration space access 432 to the RC 404. The configuration space access 432 can include instructions to write data to the configuration space 410 (including the data to be written) or read data from the configuration space 410. The configuration space access device 414 receives the configuration space access 432 and accesses the configuration space 410 of the PCI device 408. The PCI device 408 sends a reply 434 from the configuration space 410 with an acknowledgement that the data was written to the configuration space 410 or the data that was read from the configuration space 410. The configuration space access device 414 receives the reply 434 from the configuration space 410 and forwards it to the CPU 402.

When the activity 430 of the PCI device 408 indicates that the PCI device has been inactive for a predetermined period of time, the determining device 412 sends a snapshot creation trigger 436 to the snapshot creation device 416. The snapshot creation device 416 sends a request 438 for a snapshot from the configuration space 410 of the PCI device 408. The configuration space 410 returns the snapshot 440 to the snapshot creation device 416. The snapshot creation device 416 sends the snapshot 440 to the snapshot copy device 418, which copies the snapshot 440 to the memory 406. The determining device 412 then sends a redirection control trigger 442 to the configuration space access device 414 to enable the redirection function. The PCI device 408 can then be powered down through well-established mechanisms implemented by the designer on the PC platform.

As long as the redirection function is enabled, whenever the configuration space access device 414 receives a configuration space access 432, it will be sent to the redirecting device 420 instead of the PCI device 408. Upon receiving a configuration space access 432, the redirecting device 420 accesses the memory 406 to perform the configuration space access. The memory 406 sends a reply 444 to the redirecting device 420; the contents of the reply 444 from the memory are similar to the contents of the reply 434 from the configuration space 410. The redirecting device 420 forwards the reply 444 to the configuration space access device 414, which forwards the reply 444 to the CPU 402.

When the determining device 412 detects that activity 430 at the PCI device 408 has resumed, the redirection function is to be deactivated. The determining device 412 sends a configuration space restore trigger 446 to the snapshot copy device 418. The snapshot copy device 418 retrieves the memory contents 448 from the memory 406. The snapshot copy device 418 restores the contents of the configuration space 410 with the memory contents 448. The determining device 412 then sends a redirection control trigger 442 to the configuration space access device 414 to deactivate the redirection function. Subsequent configuration space accesses 432 are handled by the configuration space 410, as described above.

One or more devices and drivers may leverage this mechanism to redirect configuration space accesses to shut down a larger bus sub-topology. The transition time achievable by this approach is orders of magnitude faster than other solutions (10-100 ms versus five seconds) and is transparent to the rest of the OS and applications. It is also a platform chipset feature that can work with existing AIB hardware on current and legacy OSes if the AIB hardware driver is modified to support the feature.

Redirection of multi-function devices is also supported. This can be accomplished by configuring the redirection function to match not only the device, but also the device function components of the bus routing information. As these scenarios may require redirecting multiple PCI device configuration space accesses (that may be up to 4 KB in size each), the redirection function can support redirection of an arbitrary number of devices. The number of devices is only limited by the available amount of storage for the configuration space data, which is a design choice for the PC platform.

The following application scenarios may benefit from using the redirection function. It is noted that these scenarios are merely exemplary, and that other application scenarios not listed may also benefit from using the redirection function.

1. Mobile discrete graphics or an integrated graphics linked display adapter in which unused GPUS, RAM, and bus can be fully powered off instead of being in an idle state or in the $D3_{hot}$ state without impacting the OS.

2. Multi-GPU add-in boards (AIBs) in desktop platforms for collaborative rendering. Unused GPUs and supporting local RAM on the AIB can be fully powered off for regular desktop use under a light graphics load. These components can be activated transparently by the graphics driver with relatively low latency if higher performance is needed for some tasks.

3. Attached graphics (e.g., in external devices or docking stations).

4. On-board server graphics and other devices that may only be used with specific local console access requirements (for security purposes).

5. Devices used for special-purpose tasks only (e.g., General-Purpose computation on Graphics Processing Units (GPGPU) or a physics processing unit) that are generally idle.

6. Add-on devices that are only periodically used (e.g., IEEE-1394, Bluetooth, wireless, modem, or unused USB hubs and ports) that in the past would have been controlled by added system switches and introduced by system firmware via the "device hotplug" PnP mechanism to the OS.

Using the redirection function provides advantages as compared to the known solutions.

1. An advantage over using PnP operation is that the redirection function is transparent to software, there are no application compatibility problems, and the redirection function has a faster transition time.

2. An advantage over using device voltage islands is that with the redirection function, the bus interface is not powered and saved power leakage and other power consumption adds up to additional power savings on the order of 0.4-3 W, depending on the actual hardware.

3. An advantage over using a PCI filter driver is that the redirection function permits handling of platform scenarios like hardware virtual machine (VM) support, SMM, and direct I/O that cannot be handled by a software based approach, and the redirection function provides better system reliability.

Application to Other Peripheral Device Protocols

While a particular embodiment of the present invention has been described in terms of a PCI device, the principles of the present invention equally apply to any type of PCI device (including PCI, PCI-X, and PCI-Express) and to other types of bus protocols.

Figure 5:
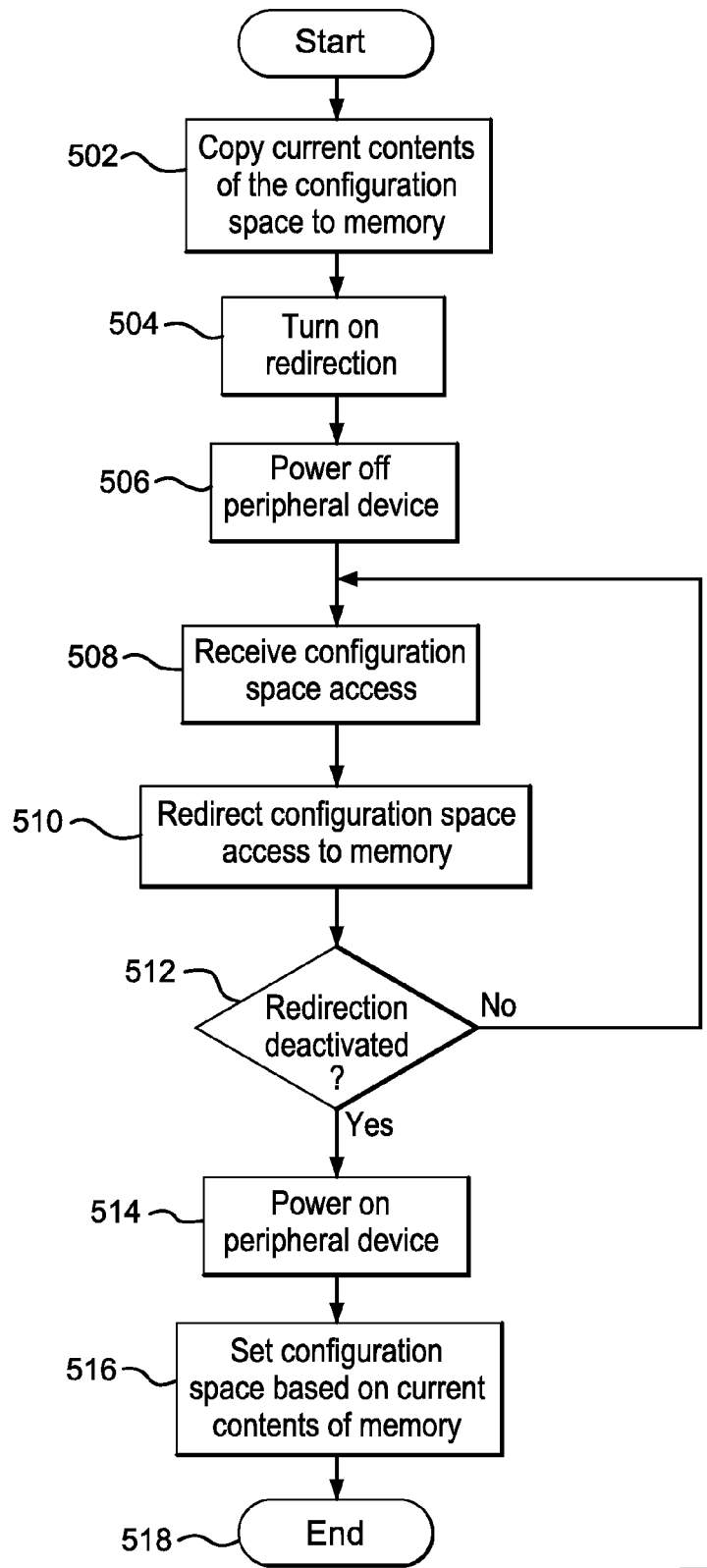
FIG. 5 is a flowchart of a method for performing a configuration space redirection for a peripheral device.

FIG. 5 is a flowchart of a method 500 for performing a configuration space redirection for a given peripheral device. The current contents of the device's configuration space are copied to a predetermined memory location assigned to the redirected device (step 502). The redirection function is then activated (step 504). The controlling software (e.g., device driver) enables and disables the redirection function depending on the idle state of the peripheral device(s) associated with the operation. The hardware state is saved and later restored to a level to allow uninterrupted software operation after exiting the idle state. The peripheral device is then powered off (step 506). The redirection function is also able to access the redirection storage to populate the memory location with pre-shutdown values and read any updated values from the OS while the device was shut down (i.e., the hardware device's power rails are powered down while the hardware is idle).

The redirection function receives a configuration space access request for the peripheral device (step 508). The redirection function redirects the configuration space access request to the predetermined memory location (step 510). After the redirection functionality has been enabled, any further accesses to the configuration space by the OS peripheral driver or system software are now serviced by the memory until the redirection function is deactivated. The redirection function has to ensure that sections of the configuration space that are required to be read-only by the underlying protocol specifications follow this behavior.

A determination is made whether the redirection function has been deactivated (step 512). When the OS or the device driver requires the peripheral device to operate again, the driver restores the device hardware and the bus links to the pre-shutdown state, updates the device's configuration space to the settings the OS last provided, and continues servicing the OS request. If the redirection function has not been deactivated (step 512), then the redirection function continues to handle any configuration space access requests for the peripheral device.

If the redirection function has been deactivated (step 512), then the peripheral device is powered on (step 514). The configuration space is set based on the current contents of the memory (step 516). Before the redirection is deactivated, the software powers up the peripheral device, reinitializes the device to the pre-power-off state (this may be coordinated by the IHV device driver), and resets the device's configuration space content according to any changes made by the OS for the writable memory locations. The method then terminates (step 518).

FIG. 6 is a diagram of a computer system 600 configured to perform configuration space redirection for a peripheral device in accordance with another embodiment of the invention. It is noted that the computer system 600 is exemplary and the one skilled in the art may design other computer systems to implement the redirection function.

The system 600 includes a CPU 602, a Root Complex (RC) 604, a memory 606, and a peripheral device 608 having a configuration space 610. The RC 604 includes a determining device 612, a configuration space access device 614, and a redirecting device 616. In one embodiment, the configuration space access device 614 does not exist independently of the redirection device 616. While the determining device 612, the configuration space access device 614, and the redirecting device 616 are shown as separate devices, the functionality of these devices may be incorporated into a single device. Furthermore, the functionality of these devices may be embodied in discrete hardware devices, a single hardware device, discrete software modules, or a single software module.

In operation, the system 600 functions as follows. The determining device 612 monitors the activity 620 of the peripheral device 608. The CPU 602 issues a configuration space access 622 to the RC 604. The configuration space access 622 can include instructions to write data to the configuration space 610 (including the data to be written) or read data from the configuration space 610. The configuration space access device 614 receives the configuration space access 622 and accesses the configuration space 610 of the peripheral device 608. The peripheral device 608 sends a reply 624 from the configuration space 610 with an acknowledgement that the data was written to the configuration space 610 or the data that was read from the configuration space 610. The configuration space access device 614 receives the reply 624 from the configuration space 610 and forwards it to the CPU 602.

When the activity 620 of the peripheral device 608 indicates that the peripheral device has been inactive for a predetermined period of time, the determining device 612 sends a copy trigger 626 to the redirecting device 616. The redirecting device 616 sends a request 628 for a copy of the contents of the configuration space 610 of the peripheral device 608. The configuration space 610 returns the copy of the contents 630 to the redirecting device 616. The redirecting device 616 sends the copy of the contents 630 to the memory 606. The determining device 612 then sends a redirection control trigger 632 to the configuration space access device 614 to enable the redirection function. The peripheral device 608 can then be powered down through well-established mechanisms implemented by the designer on the PC platform.

As long as the redirection function is enabled, whenever the configuration space access device 614 receives a configuration space access 622, it will be sent to the redirecting device 616 instead of the peripheral device 608. Upon receiving a configuration space access 622, the redirecting device 616 accesses the memory 606 to perform the configuration space access. The memory 606 sends a reply 634 to the redirecting device 616; the contents of the reply 634 from the memory are similar to the contents of the reply 624 from the configuration space 610. The redirecting device 616 forwards the reply 634 to the configuration space access device 614, which forwards the reply 634 to the CPU 602.

When the determining device 612 detects that activity 620 at the peripheral device 608 has resumed, the redirection function is to be deactivated. The determining device 612 sends a configuration space restore trigger 636 to the redirecting device 616. The redirecting device 616 retrieves the memory contents 638 from the memory 606. The redirecting device 616 restores the contents of the configuration space 610 with the memory contents 638. The determining device 612 then sends a redirection control trigger 632 to the configuration space access device 614 to deactivate the redirection function. Subsequent configuration space accesses 622 are handled by the configuration space 610, as described above.

The present invention can be implemented in a computer program tangibly embodied in a computer-readable storage medium containing a set of instructions for execution by a processor or a general purpose computer. Method steps can be performed by a processor executing a program of instructions by operating on input data and generating output data. Suitable processors include, by way of example, both general and special purpose processors. Typically, a processor receives instructions and data from a read-only memory (ROM), a random access memory (RAM), and/or a storage device. Storage devices suitable for embodying computer program instructions and data include all forms of non-volatile memory, including by way of example, semiconductor memory devices, magnetic media such as internal hard disks and removable disks, magneto-optical media, and optical media such as CD-ROM disks and digital versatile disks (DVDs). In addition, while the illustrative embodiments may be implemented in computer software, the functions within the illustrative embodiments may alternatively be embodied in part or in whole using hardware components such as Application Specific Integrated Circuits (ASICs), Field Programmable Gate Arrays (FPGAs), or other hardware, or in some combination of hardware components and software components.

While specific embodiments of the present invention have been shown and described, many modifications and variations could be made by one skilled in the art without departing from the scope of the invention. The above description serves to illustrate and not limit the particular invention in any way.

What is claimed is:

1. A method for redirecting accesses to a peripheral device's configuration space, comprising:
    copying the current contents of the configuration space to a memory, wherein the memory is separate from the peripheral device;
    redirecting accesses from the configuration space to the memory, whereby:
        the redirecting allows the peripheral device to be powered off; and
        the memory services the accesses to the configuration space when the peripheral device is powered of;
    powering on the peripheral device if the redirecting has been deactivated; and
    setting the peripheral device's configuration space based on the current contents of the memory, whereby accesses to the configuration space are serviced by the configuration space.

2. The method according to claim 1, further comprising:
  determining whether the peripheral device has been inactive for a predetermined period of time prior to redirecting accesses from the peripheral device's configuration space.

3. The method according to claim 2, wherein the determining includes monitoring activity of the peripheral device to determine when the peripheral device becomes inactive.

4. The method according to claim 1, wherein the redirecting is deactivated when a device driver requests access to functionality of the peripheral device.

5. The method according to claim 1, wherein the peripheral device uses a peripheral component interconnect protocol.

6. A system for redirecting accesses to a peripheral device's configuration space, comprising:
  a peripheral device having a configuration space;
  a memory located separate from the peripheral device;
  a root complex in communication with the peripheral device and the memory, the root complex configured to:
    copy the current contents of the configuration space to the memory; and
    redirect accesses from the configuration space to the memory,
  wherein the system is configured to power off the peripheral device when the root complex is redirecting accesses from the configuration space to the memory,
  whereby the memory services the accesses to the configuration space when the peripheral device is powered off;
  wherein the system is configured to power on the peripheral device; and
  the root complex is further configured to:
    deactivate the redirecting; and
    set the peripheral device's configuration space based on the current contents of the memory, whereby accesses to the configuration space are serviced by the configuration space.

7. The system according to claim 6, wherein the root complex is further configured to:
  determine whether the peripheral device has been inactive for a predetermined period of time prior to redirecting accesses from the peripheral device's configuration space.

8. The system according to claim 7, wherein the root complex is further configured to:
  monitor activity of the peripheral device to determine when the peripheral device becomes inactive.

9. The system according to claim 6, wherein the root complex is configured to deactivate the redirecting when the root complex needs to access a function of the peripheral device.

10. The system according to claim 6, wherein the peripheral device uses a peripheral component interconnect protocol.

11. A root complex for redirecting accesses to a peripheral device's configuration space, comprising:
  a configuration space access device, configured to access the configuration space; and
  a redirecting device configured to:
    copy the current contents of the configuration space to a memory, the memory being located separate from the peripheral device; and
    redirect accesses from the configuration space to the memory, whereby the memory services the accesses to the configuration space if the peripheral device is powered of;
  a determining device, configured to:
    monitor activity at the peripheral device; and
    send a redirection control trigger to the configuration space access device to enable the redirecting device, the redirection control trigger being sent when the peripheral device has been inactive for a predetermined period of time;
    send a second redirection control trigger to the configuration space access device to deactivate the redirecting device, the second redirection control trigger being sent when the root complex needs to access a function of the peripheral device; and
    send a configuration space restore trigger to the redirecting device when the root complex needs to access a function of the peripheral device; and
  the redirecting device is further configured to copy the contents of the memory to the configuration space, thereby restoring the contents of the configuration space.

12. The root complex according to claim 11, wherein the redirecting device is further configured to copy the contents of the memory to the configuration space, thereby restoring the contents of the configuration space.

13. The root complex according to claim 11, wherein the determining device is further configured to send a copy trigger to the redirecting device to copy the current contents of the configuration space to the memory when the peripheral device has been inactive for the predetermined period of time.

14. The root complex according to claim 11, wherein the peripheral device uses a peripheral component interconnect protocol.

* * * * *

UNITED STATES PATENT AND TRADEMARK OFFICE
CERTIFICATE OF CORRECTION

PATENT NO. : 8,595,386 B2  
APPLICATION NO. : 12/534351  
DATED : November 26, 2013  
INVENTOR(S) : Paul Blinzer Page 1 of 1

It is certified that error appears in the above-identified patent and that said Letters Patent is hereby corrected as shown below:

IN THE CLAIMS:

In claim 1, column 10, line 61, change "powered of;" to -- powered off; --.

In claim 6, column 11, line 28, change "powered of;" to -- powered off; --.

In claim 11, column 12, line 15, change "powered of;" to -- powered off; --.

Signed and Sealed this
Twenty-fifth Day of February, 2014

Michelle K. Lee
*Deputy Director of the United States Patent and Trademark Office*